(12) United States Patent
Khosravi et al.

(10) Patent No.: US 10,255,202 B2
(45) Date of Patent: Apr. 9, 2019

(54) MULTI-TENANT ENCRYPTION FOR STORAGE CLASS MEMORY

(71) Applicant: INTEL CORPORATION, Santa Clara, CA (US)

(72) Inventors: Hormuzd M. Khosravi, Portland, OR (US); Baiju V. Patel, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/283,104

(22) Filed: Sep. 30, 2016

(65) Prior Publication Data

US 2018/0095898 A1 Apr. 5, 2018

(51) Int. Cl.
| | |
|---|---|
| *G06F 21/00* | (2013.01) |
| *G06F 12/14* | (2006.01) |
| *G06F 9/455* | (2018.01) |
| *G06F 21/44* | (2013.01) |
| *G06F 21/79* | (2013.01) |

(52) U.S. Cl.
CPC ...... *G06F 12/1408* (2013.01); *G06F 9/45558* (2013.01); *G06F 12/1475* (2013.01); *G06F 21/445* (2013.01); *G06F 21/79* (2013.01); *G06F 2009/45595* (2013.01); *G06F 2212/1052* (2013.01); *G06F 2221/2107* (2013.01); *G06F 2221/2115* (2013.01)

(58) Field of Classification Search
CPC .. G06F 12/1408; G06F 12/1475; G06F 12/10; G06F 9/45558; G06F 2212/152; G06F 2212/151; G06F 2212/1052; G06F 2009/45595

See application file for complete search history.

(56) References Cited

U.S. PATENT DOCUMENTS

| | | | | |
|---|---|---|---|---|
| 4,604,688 A | * | 8/1986 | Tone | ........ G06F 12/1475 711/207 |
| 5,915,025 A | * | 6/1999 | Taguchi | ........ G06F 12/145 380/44 |
| 7,415,575 B1 | * | 8/2008 | Tong | ........ G06F 12/126 711/129 |
| 9,350,536 B2 | | 5/2016 | Sabin | |
| 2002/0138707 A1 | * | 9/2002 | Suzuoki | ........ G06F 9/544 711/163 |
| 2004/0013117 A1 | * | 1/2004 | Hendel | ........ H04L 49/90 370/394 |
| 2007/0288721 A1 | * | 12/2007 | Kruger | ........ G06F 9/30043 711/207 |
| 2007/0294490 A1 | * | 12/2007 | Freitas | ........ G06F 12/0246 711/154 |

(Continued)

OTHER PUBLICATIONS

International Search Report received for PCT Patent Application No. PCT/US2017/050463, dated Jan. 3, 2018, 3 pages.

*Primary Examiner* — John B King

(57) ABSTRACT

Various embodiments are generally directed to the providing for mutual authentication and secure distributed processing of multi-party data. In particular, an experiment may be submitted to include the distributed processing of private data owned by multiple distrustful entities. Private data providers may authorize the experiment and securely transfer the private data for processing by trusted computing nodes in a pool of trusted computing nodes.

26 Claims, 12 Drawing Sheets

(56) References Cited

U.S. PATENT DOCUMENTS

| | | | |
|---|---|---|---|
| 2008/0229117 A1* | 9/2008 | Shin | G06F 21/123 |
| | | | 713/190 |
| 2011/0283113 A1* | 11/2011 | Moffat | G06F 21/602 |
| | | | 713/189 |
| 2012/0317388 A1* | 12/2012 | Driever | G06F 12/0646 |
| | | | 711/170 |
| 2014/0082313 A1* | 3/2014 | Miller, Jr. | G06F 12/08 |
| | | | 711/166 |
| 2014/0283010 A1 | 9/2014 | Rutkowski et al. | |
| 2014/0301391 A1* | 10/2014 | Krishnan | H04L 45/66 |
| | | | 370/390 |
| 2015/0319192 A1* | 11/2015 | Cabrera | H04L 63/20 |
| | | | 726/1 |
| 2016/0188911 A1 | 6/2016 | Diep et al. | |
| 2016/0246730 A1* | 8/2016 | Gandhi | G06F 12/1009 |
| 2016/0259807 A1 | 9/2016 | Factor et al. | |
| 2016/0277503 A1 | 9/2016 | Hayes et al. | |
| 2017/0371809 A1* | 12/2017 | Benedict | G06F 12/1408 |

\* cited by examiner

MULTI-TENANT ENCRYPTION FOR STORAGE CLASS MEMORY

TECHNICAL FIELD

Embodiments described herein generally relate to memory encryption and particularly, to multiple tenant encryption for virtualization environments and storage class memory.

BACKGROUND

Modern servers may include a non-volatile storage medium having random access memory (RAM) like characteristics. For example, such non-volatile storage medium can have a low latency and high bandwidth similar to RAM, but may maintain data in a non-volatile manner. Such storage mediums are often referred to as storage class memory (SCM). SCM systems provide a direct access storage (DAS) mode without DMA. Said differently, servers with SCM may allow application to access data stored on the SCM without using direct memory access (DMA), such as, for example, by using zero copy access. However, as zero copy access bypasses some of the conventional layers in the storage software stack, conventional encryption techniques may not be implementable for SCM operating in DAS mode.

DETAILED DESCRIPTION

Figure 1A:
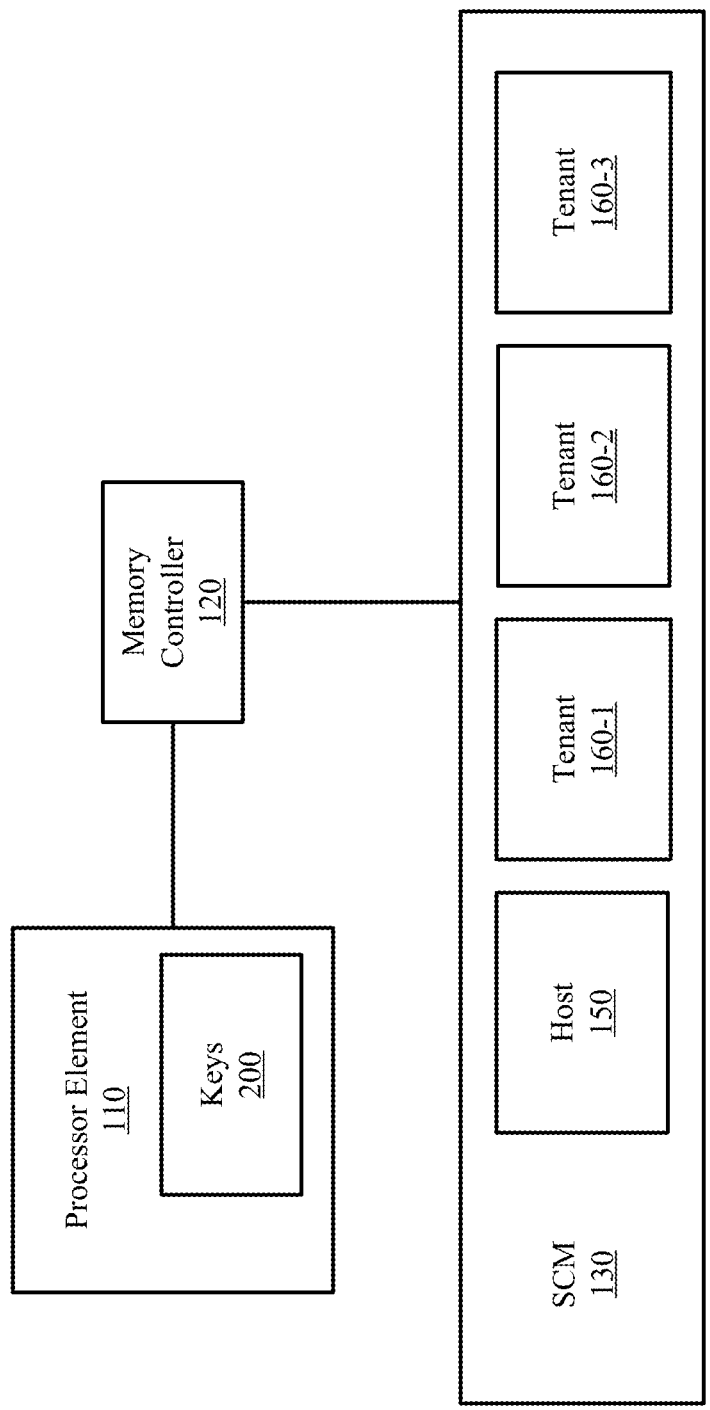
FIGS. 1A-1B illustrate block diagrams of a multi-tenant system to access a storage class memory (SCM) in direct access mode (DAS) according to an embodiment.

Various embodiments are generally directed to providing encryption for storage class memory (SCM) operating in direct access storage (DAS) mode. In particular, encryption of SCM for multi-tenant usage is provided. For example, SCM, or an array of SCM can be provided to store information corresponding to multi-tenant system, which may include an operating system, virtual machine manager, and individual tenant data (e.g., virtual machines).

The SCM can be coupled to a memory controller and a processing element implemented to provide a computing environment for the tenants (e.g., virtual machines). In general, the present disclosure provides to encrypt individual tenant data in the SCM using separate keys and to reference the keys with a unique identification indicator for each tenant. Encrypted memory locations (e.g., pages, or the like) in the SCM can be referenced with a physical address including an indication of the tenant unique identification indicator and the physical address of the encrypted data in the SCM. The keys can be stored, for example, in a processing element cache or trusted execution environment. As such, during operation, the SCM can be accessed using DAS and data encrypted and/or decrypted based on referencing the encryption keys with the tenant identification indication component of the physical address.

With general reference to notations and nomenclature used herein, portions of the detailed description that follow may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. The apparatus may be specially constructed for the required purpose or may incorporate a general computing device. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation.

Figure 1B:
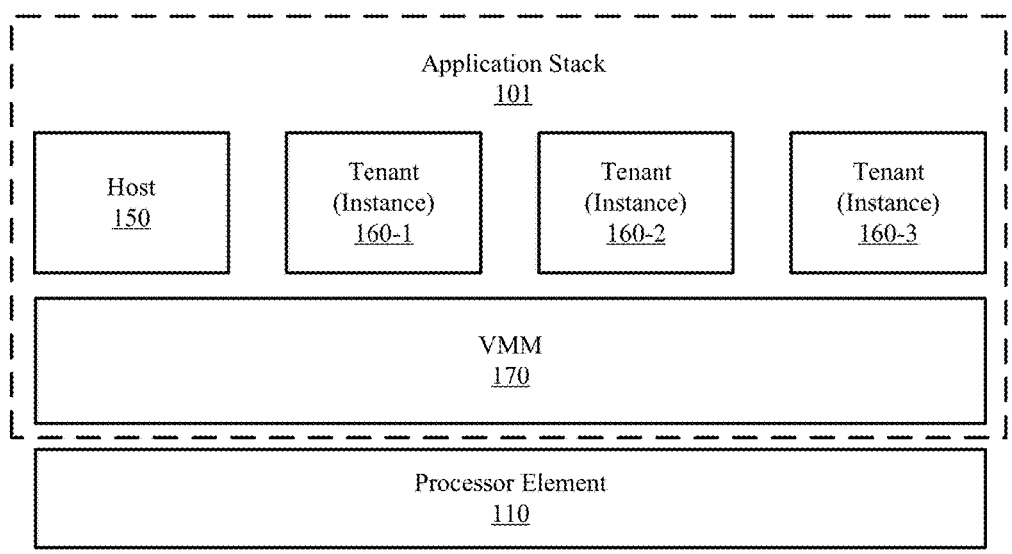
Figure 2:
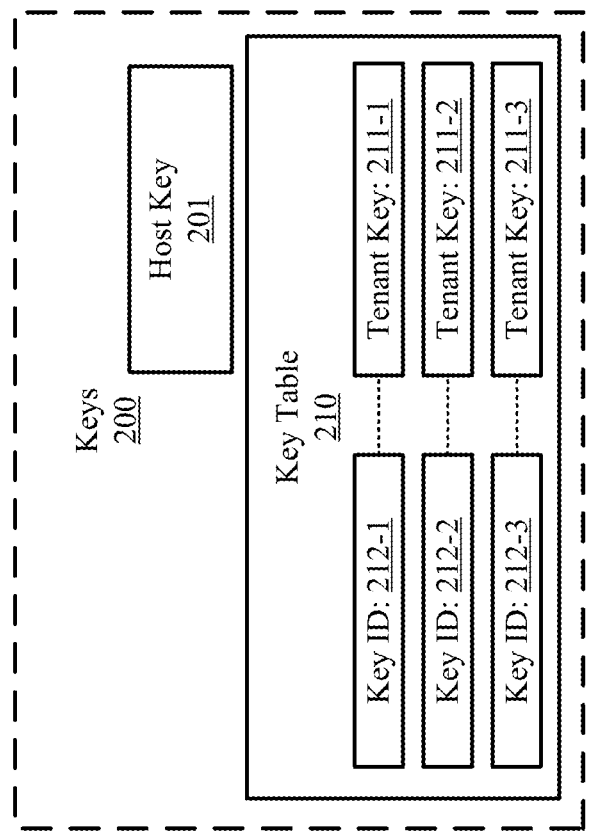
FIG. 2 illustrates a block diagram of a portion of the multi-tenant system of FIGS. 1A-1B in greater detail.

FIGS. 1A-1B and FIG. 2 depict a multi-tenant system 100 including a processing element 110, a memory controller 120 and storage class memory 130. Referring now to FIG. 1A, the multi-tenant system 100 can be implemented to execute applications and/or threads corresponding to multiple tenants, such as, for example, virtual machines, containers, or the like. It is important to note, that although the system 100 is depicted including discrete elements (e.g., processor element 110 and SCM 130), in practice the system 100 can be composed of a combination of disaggregate physical elements, such as, from a data center, or the like. Said differently, the processor element 110 can be a central processing unit, a central processing unit comprising multiple cores, a combination of many central processing units, a number of cores from a central processing unit, processing cores from an application specific processor, or the like. Additionally, the SCM 130 can be any combination of storage class memory elements, such as, for example, dynamic random access memory (DRAM), NAND memory, NOR memory, 3-Dimensional cross-point memory, ferroelectric memory, silicon-oxide-nitride-oxide-silicon (SONOS) memory, polymer memory such as ferroelectric polymer memory, ferroelectric transistor random access memory (FeTRAM or FeRAM), nanowire, phase change memory, magnetoresistive random access memory (MRAM), spin transfer torque MRAM (STT-MRAM) memory, or the like.

The memory controller 120 can be arranged to provide access to the SCM 130. In particular, the memory controller 120 can provide access to the SCM via a DAS mode, such as, for example, zero copy, or the like. Portions of the SCM 130 can be encrypted to provide security for the information indicated in SCM 130. For example, a first portion corresponding to information for a host 150 (e.g., operating system (OS), tenant manager, or the like) can be encrypted. Additionally, portions corresponding to information for individual tenants can be encrypted to provide security and isolation between individual tenant data. For example, portions of SCM 130 can be provided to store data related to tenants 160-1, 160-2 and 160-3. It is important to note, the system 100 can be implemented to host and/or support any number of individual tenants. Three tenants 160-1, 160-2, and 160-3 are depicted for purposes of clarity of presentation only and not to be limiting. It is important to note, that encrypted portions of the SCM 130 may not be located contagiously through SCM 130. For example, information corresponding o tenant 160-1 can be located in various physical memory locations of SCM 130. This is more clearly illustrated in FIG. 4.

In general, host 150 can be any entity configured to host tenants. For example, host 150 can be an operating system and a corresponding tenant manager, such as, for example, a virtual machine manager arranged to host tenants 160-1 to 160-3. In general, the tenants 160-1 to 160-3 can be any combination of entities hosted and/or supported by the system 100. For example, the tenants 160-1 can be virtual machines, containers, some combination of the two, or the like. Each portion of the SCM (e.g., OS/TM 150, tenant 160-1, tenant 160-2, tenant 160-3, or the like) can be encrypted with one of encryption keys 200 (e.g., refer to FIG. 2). In some examples the encryption keys 200 can be stored on the processing unit 110, such as, for example, in cache, in a secure register, in a trusted execution environment, or the like.

Turning more particularly to FIG. 1B, an application stack 101 of node including host 150 is depicted. It is noted, the system 100 can be implemented across multiple nodes in a fabric of nodes. That is, system 100 can be implemented on disaggregate physical computing resources that are composed to form computing nodes. Each computing node can have various computing resources and can host tenants or portions of system 100. However, for clarity, processor element 110 is depicted having application stack 101 including host 150, virtual machine manager (VMM) 170, and tenants 160-1, 160-2 and 160-3. In general, host 150 can include a host operating system (OS) kernel. In some examples (e.g., as depicted) VMM 170 may be implemented below the host OS kernel (so-called type-1 model). In other examples, VMM 170 may be configured to operate as a KVM or hypervisor (so-called type-2 model) to manage various operations and/or configurations for tenants (e.g., VMs, containers, or the like) hosted by processor element 100 (or that is, hosted by the node corresponding to processor element 110). The host OS kernel may be arranged to implement VMM 170. It is noted, that VMM 170 is not depicted above host 150 in the stack 101. However, the concept of the VMM 170 above the host 150 can still be applied. VMM may manage provisioning of computing resources and/or processing tasks to tenants 160-1, 160-2 and 160-3 and can manage routing networking connections between tenants 160-1, 160-2 and 160-3 and host 150. Furthermore, VMM 170 can manage provisioning and configuration of tenants 160-1, 160-2 and 160-3 (or instances of tenants 160). It is noted, that is some examples, operations described herein to provide DAS mode access to the SCM 130 by tenants 160 can be implemented by host 150 and/or by VMM 170. However, for purposes of clarity, examples are described from the perspective of the host 150, which can implement a VMM, or can execute a VMM. However, standalone VMMs can be provided to provide DAS mode access as described herein. Examples are not limited in this context.

It is noted, SCM 130 does not execute host 150 or tenants 160. Instead, SCM can store data and/or information related to host 150 and tenants 160. Accordingly, as depicted in FIGS. 1A-1B, SCM stored data related to host 150 and tenants 160 while host 150 and tenants 160 execute on processor element 110 in stack 101.

Turning more particularly to FIG. 2, a more detailed depicted of keys 200 is given. As depicted, keys 200 can include an OS/TM key 201, and multiple tenant keys 211. In particular, a tenant key 211 is depicted for each tenant depicted in FIG. 1. As such, tenant key 211-1 corresponding to tenant 160-1, tenant key 211-2 corresponding to tenant 160-2, and tenant key 211-3 corresponding to tenant 160-3 are depicted. Tenant keys 211 can be stored in a key table 210. In some examples, the key table 210 can be stored in a cache of processing element 110, in a secure register of processor element 110, or in a trusted execution environment of processor element 110.

The key table 210 can include an information element to include indications the keys 211 and can also include an index 212 or identifier for each key 211. For example, key 211-1 can have an indication or index 212-1, key 211-2 can have an indication or index 212-2, and key 211-3 can have an indication or index 212-3. In general, the index 212 can be mapped to each tenant 160. As such, each tenant 160 can have a unique key referenced in the key table by an identifier (e.g., index 212). In some examples, each index 212 can correspond to a unique identifier for each tenant, such as, for example, a virtual machine identification (VMID), which can be a field or information element of a virtual machine control structure, (VMCS), or the like.

Figure 3:
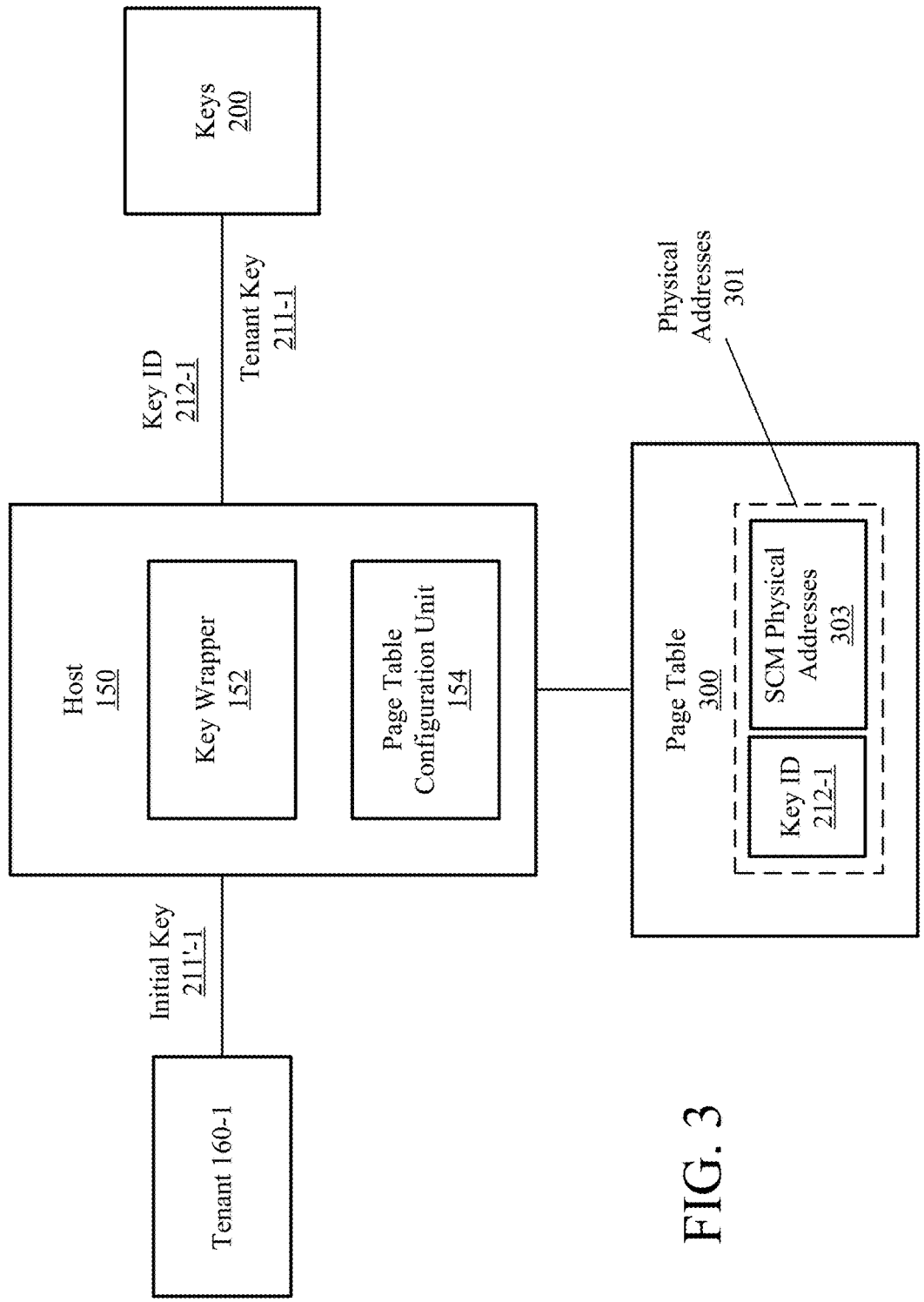
FIG. 3 depicts a block diagram of a portion of the multi-tenant system of FIGS. 1-2 in greater detail according to an embodiment.

FIG. 3 depicts an embodiment of the multi-tenant system 100 of FIG. 1 in greater detail. In particular, this figure depicts an embodiments including host 150 arranged to generate keys 200 and configure SCM 130. In some examples, host 150 can include a key wrapper 152 and a page table configuration unit 154. It is noted, that with some embodiments, the host 150 could include a boot loader (e.g., basic input/output system (BIOS), or the like) to implement key wrapper 152 or page table configuration unit 154. In general, the host 150 can receive an initial key 211' and generate a key ID 212 and tenant key 211 from the initial key 211'. For example, as depicted, the host 150 can receive initial key 211'-1 from tenant 160-1 and generate key ID 212-1 and tenant key 211-1.

For example, the host 150 can be arranged to generate key ID 212 and tenant key 211 during an initialization of a tenant. In particular, host 150 can receive an initial key 211'-1 from tenant 160-1 during an initialization (e.g., provisioning, first boot, or the like) of tenant 160-1 and can generate key ID 212-1 (e.g., unique ID corresponding to the tenant 160-1, or the like) and tenant key 211-1. In some examples, initial key 211' can be generated by the tenant 160. In some examples, initial key 211' can be generated by the host 150. In some examples, tenant key 211'-1 can be a wrapped version of initial key 211'-1. Tenant key 211 can initial key 211' wrapped via a key wrapping scheme using, for example, host key 201, or another key specific to the system 100. With some examples, key wrapper 152 can be arranged to receive the initial key 211' and generate the wrapped key 211.

Host 150 can also be arranged to initialize portions (e.g., memory pages, or the like) of SCM 130 for a tenant 160. For example, host 150 can be arranged to initialize a page table 300 for SCM 130, or portions of the SCM 130. In particular, host 150 can set entries in a page table 300 of pages in SCM 130 corresponding to tenant 160-1 to point to tenant key 211-1. More specifically, host 150 can set the physical address component 301 of the page table 300 to reference the key ID 212-1 and an SCM physical address 303 (e.g., actual physical address). In some examples, page table configuration unit 154 can configure the page tables of SCM 130 corresponding to the tenant 160-1.

For example, in some embodiments tenant 160-1 can be a virtual machine. As such, during initialization of the virtual machine, a security component of the virtual machine (e.g., BitLocker, or the like) can generate initial key 211'-1 and provide initial key 211'-1 to key wrapper 152. Key wrapper 152 can generate key 211-1, for example, by wrapping initial key 211'-1. Additionally, virtual machine or key host 150 can generate a unique identification for the virtual machine (e.g., VMID, or the like) to be the key ID 212-1. The page table configuration unit 154 can configure the page tables 300 of the virtual machine memory (e.g., tenant 160-1 memory on SCM 130, or the like) to reference the tenant key 211-1. In particular, the page table configuration unit 154 can configure an initial portion of the physical address 301 in the page table 300 to reference the key ID 212-1 while the balance the physical address 301 corresponds to the SCM physical address 303.

In general, SCM 130 can be implemented with any number of page table levels or page table schemes. However, a particular example is given for purposes of clarity. With some embodiments, SCM 130 can be arranged to have a 5 level page table scheme and a corresponding 52-bit physical address. The present disclosure may utilize the top 5 bits, or 5 most significant bits to represent the key ID 212, leaving 46 bits to represent the SCM physical address. As such, the SCM 130 can have up to 64 Tera-bytes of storage referenced by the SCM physical address 303 while still providing reference to a key ID 212 to provide encryption and decryption techniques when SCM 130 is operated in a DAS mode.

Figure 4:
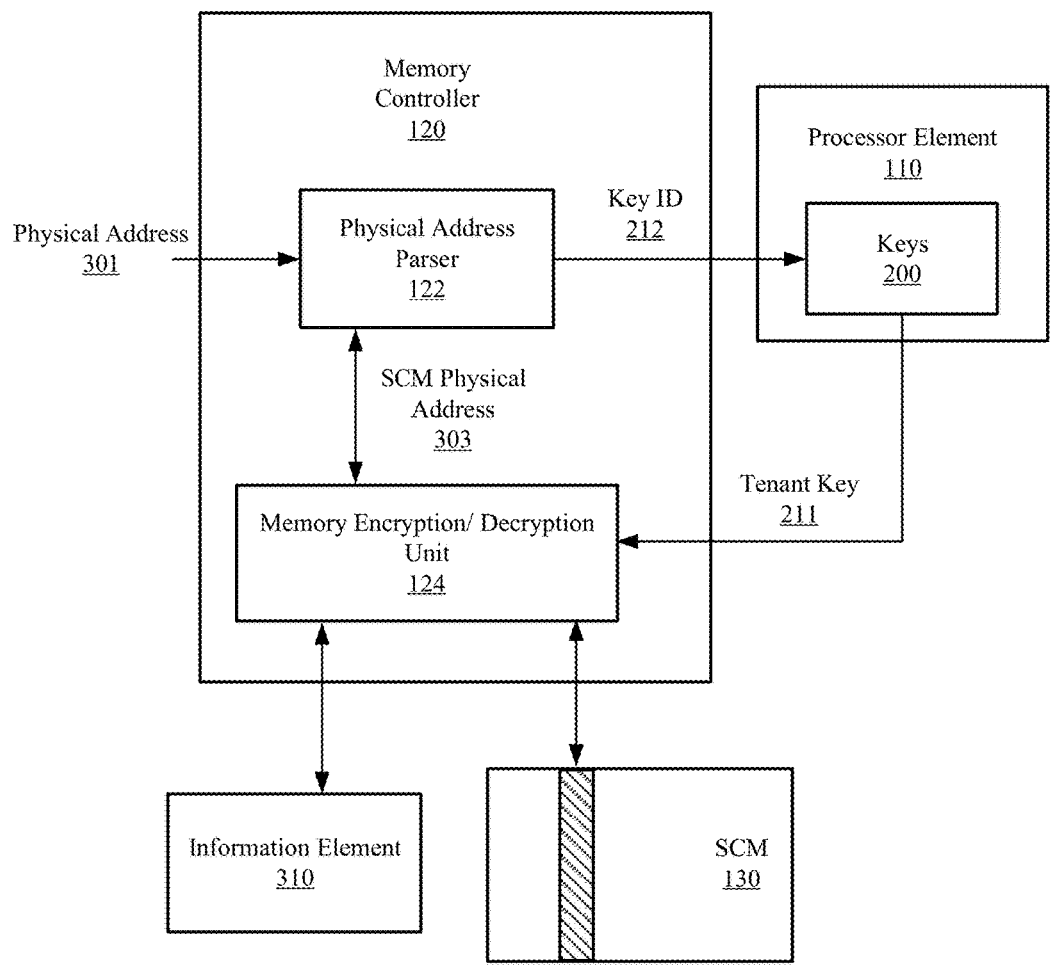
FIG. 4 depicts a block diagram of a portion of the multi-tenant system of FIGS. 1-2 in greater detail according to an embodiment.
Figure 5:
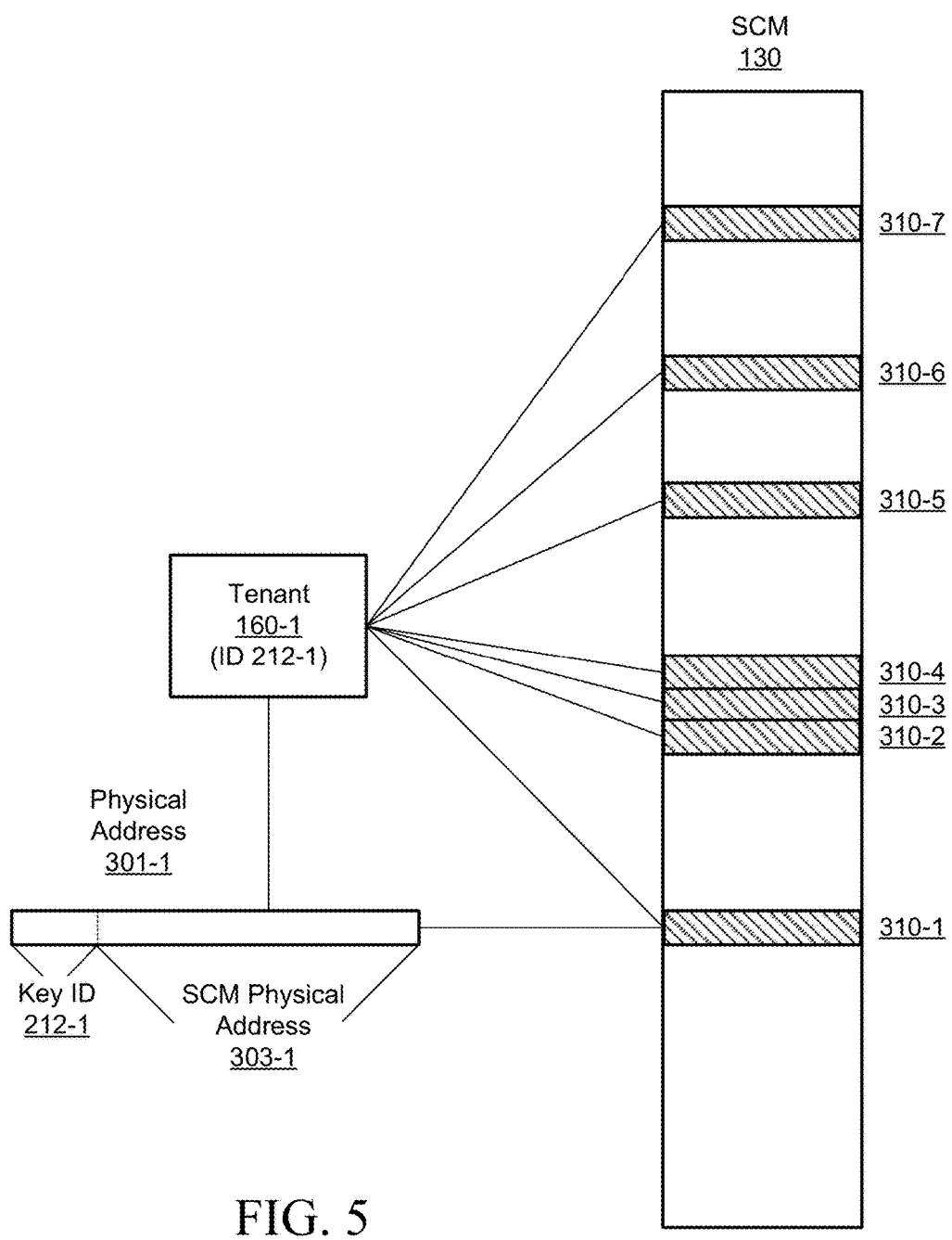
FIG. 5 depicts a block diagram of a portion of the multi-tenant system of FIGS. 1-2 in greater detail according to an embodiment.

FIGS. 4-5 depict an embodiment of the multi-tenant system 100 of FIG. 1 in greater detail. In particular, these figures depict embodiments including memory controller 120 arranged to encrypt and decrypt portions of SCM 130 based on keys 200.

Turning more specifically to FIG. 4, memory controller can include a physical address parser 122 and a memory encryption/decryption unit 124. In general, the memory controller 120 can be arranged to encrypt and decrypt portions of SCM 130 based on the keys 200. In particular, the memory controller 120 can encrypt portions of SCM 130 memory (e.g., memory pages, or the like) based on encryption keys referenced by corresponding key IDs 212 in the memory page tables for the memory pages to be encrypted. Likewise, the memory controller 120 can decrypt portions of SCM 130 memory (e.g., memory pages, or the like) based on encryption keys referenced by corresponding key IDs 212 in the memory page tables for the memory pages to be decrypted.

In particular, the physical address parser 122 can receive a physical address 301 for a memory location to be encrypted or decrypted and can determine a key ID 212 and a SCM physical address 303 from portions of the physical address 301.

Memory controller 120 can receive a tenant key 211 corresponding to the key ID referenced in the physical address 301 and can encrypt or decrypt memory in SCM 130 (e.g., at location 303, or the like) based on the received tenant key 211. For example, memory encryption/decryption unit 124 can receive tenant key 211 corresponding to key ID 212 and can encrypt an information element 310 to store in memory of SCM 130 based on the received tenant key 211 and the SCM physical address 303. As another example, memory encryption/decryption unit 124 can receive tenant key 211 corresponding to key ID 212 and can decrypt an information element 310 from encrypted memory of SCM 130 based on the received tenant key 211 and the SCM physical address 303.

Accordingly, portions of SCM 130 can be encrypted and decrypted by memory controller during DAS mode operation based on keys 200, and particularly, based on tenant keys 211 referenced by key ID 212 in physical address 301. This is more clearly illustrated in FIG. 5. Turning more particularly to FIG. 5, information related to tenant 160-1 stored in SCM 130 is more clearly depicted. It is noted, that this figure only depicts information related to tenant 160-1. However, as depicted in FIG. 1 and described herein, SCM 130 can store information related to OS/TM 150, tenant 160-2, tenant 160-3, or additional tenants not depicted in these figures.

Portions of SCM 130 store information elements 310 related to tenant 160-1. In this example, information elements 310-1, 310-2, 310-3, 310-4, 310-5, 310-6 and 310-7 are depicted. It is noted, that information elements 310 are depicted at a quantity to facilitate understanding and that during practice, more or less information elements 310 can be stored on SCM 130. In general, such information elements can be any data stored on SCM 130, such for example, data structures, software applications, data "files," or the like. Examples are not limited in this context. As depicted, the information elements 310 related to tenant 160-1 can be located in various locations (e.g., pages, physical addresses 301, or the like) within SCM 130. As such, during operation information elements related to tenant 160-1 can be addressed using a physical address 301. As described, each physical address 301 includes an indication of a tenant identifier (e.g., key ID 212) and an indication of a physical address on the SCM 130 (e.g., SCM physical address 303). For example, the physical address 301 can include an indication of tenant ID 212-1 and SCM physical address 301-1 corresponding to information element 310-1.

Figure 6:
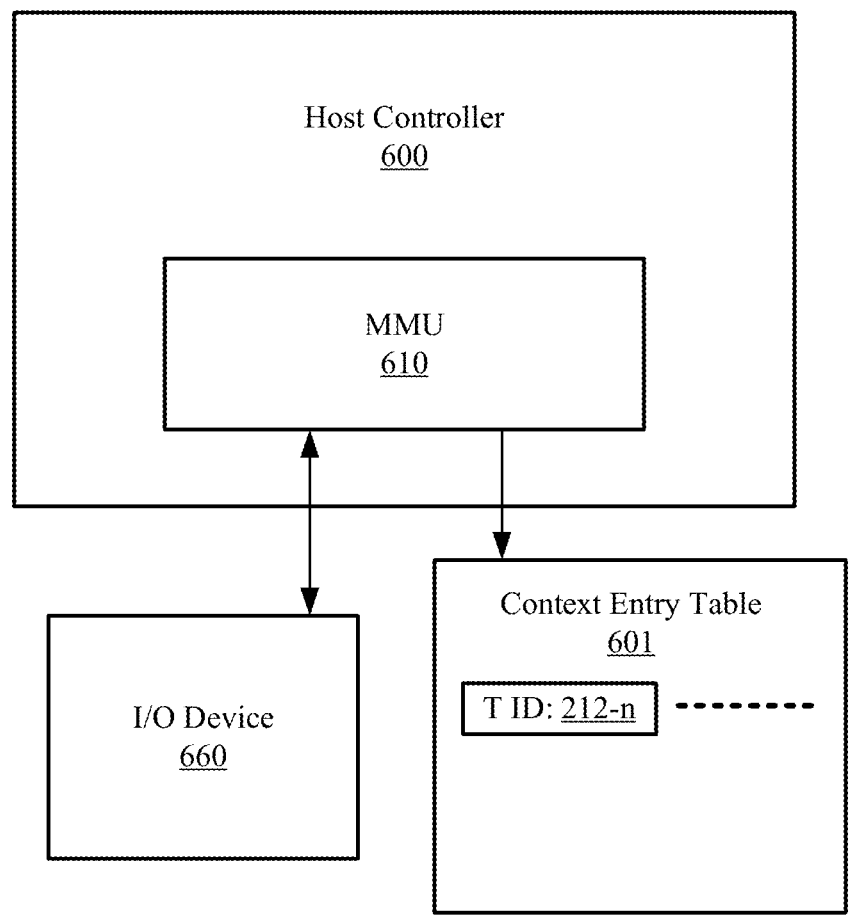
FIG. 6 depicts a block diagram of a portion of the multi-tenant system of FIGS. 1-2 in greater detail according to an embodiment.

FIG. 6 depicts an embodiment of the multi-tenant system 100 of FIG. 1 in greater detail. In particular, this figure depicts an embodiments of system 100 including a host controller 600 to provide encryption for I/O operations. In some examples, host controller 600 can include a memory management unit (MMU) 610, such as, for example, an input/output memory management unit (IOMMU), or the like. With some examples, host controller 600 can be embodied as part of processing unit 110. In some examples, host controller 600 can be embodied as part of host 150. In some examples, host controller 600 can be separate from processing unit 110 and host 150. Examples are not limited in this context.

In general, host controller, and particularly MMU 610, can translate physical memory addresses from one domain (e.g., tenant domain) to another (e.g., host domain) for purpose of I/O between a tenant and a device operably coupled to the host. Additionally, MMU 610 can configure a context entry table or page translation table (e.g., VT-d table, AMD-Vi, or the like) to include an indication to an encryption key. More particularly, MMU 610 can configure context table 601 to include an indication to key ID 212 from key table 200.

For example, host controller 600 can be arranged to provide access between one of tenants 160 (e.g., tenant 160-1, tenant 160-2, tenant 160-3, or the like) and an I/O device 660. During operation, tenant 160 can write data to or receive data from I/O device 660. The present disclosure provides memory controller 120 to encrypt or decrypt data corresponding to I/O device 660. For example, memory controller 120 can encrypt or decrypt data for direct memory access (DMA) buffers of I/O device 660. MMU 610 can configure key ID 212 in context entry table 601, which can be used by memory controller 120 to reference an encryption key 211 from key table 200 with which to encrypt or decrypt I/O device data. In particular, the MMU 610 can configure key ID 212-n within the unused bits of the physical address referenced in context table 601. It is important to note, that MMU 610 can configure context entry table 601 to reference a key ID corresponding to a tenant (e.g., key ID 212-1) or a key ID corresponding to I/O device. In the case of a key corresponding to I/O device, with some examples, the key can be generated by software executing on a tenant (e.g., BitLocker, or the like) or by processing element 110. In general, however, the key can be generated, wrapped and a key ID generated with the key ID and wrapped key referenced in the key table 200 as described herein.

Figure 7:
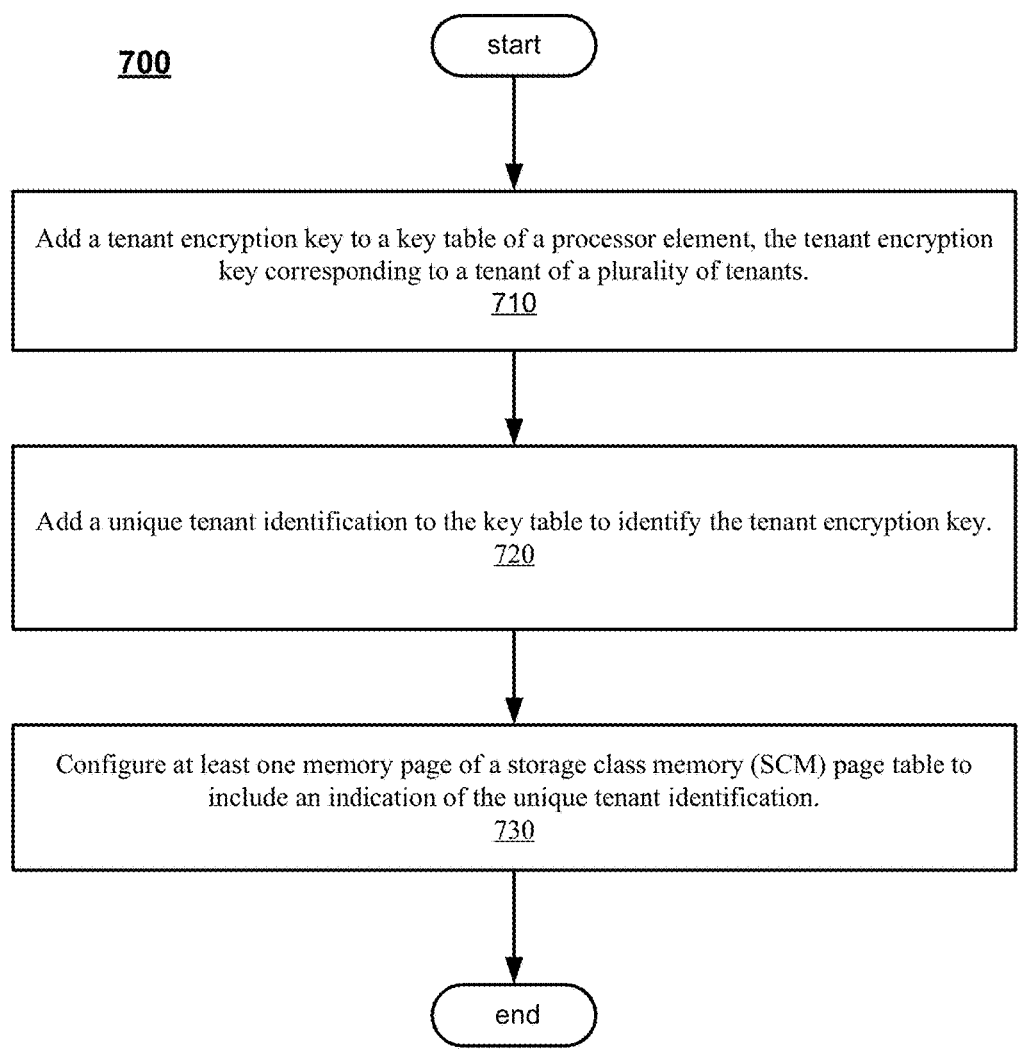
FIGS. 7-9 each illustrate a logic flow according to various embodiments.
Figure 8:
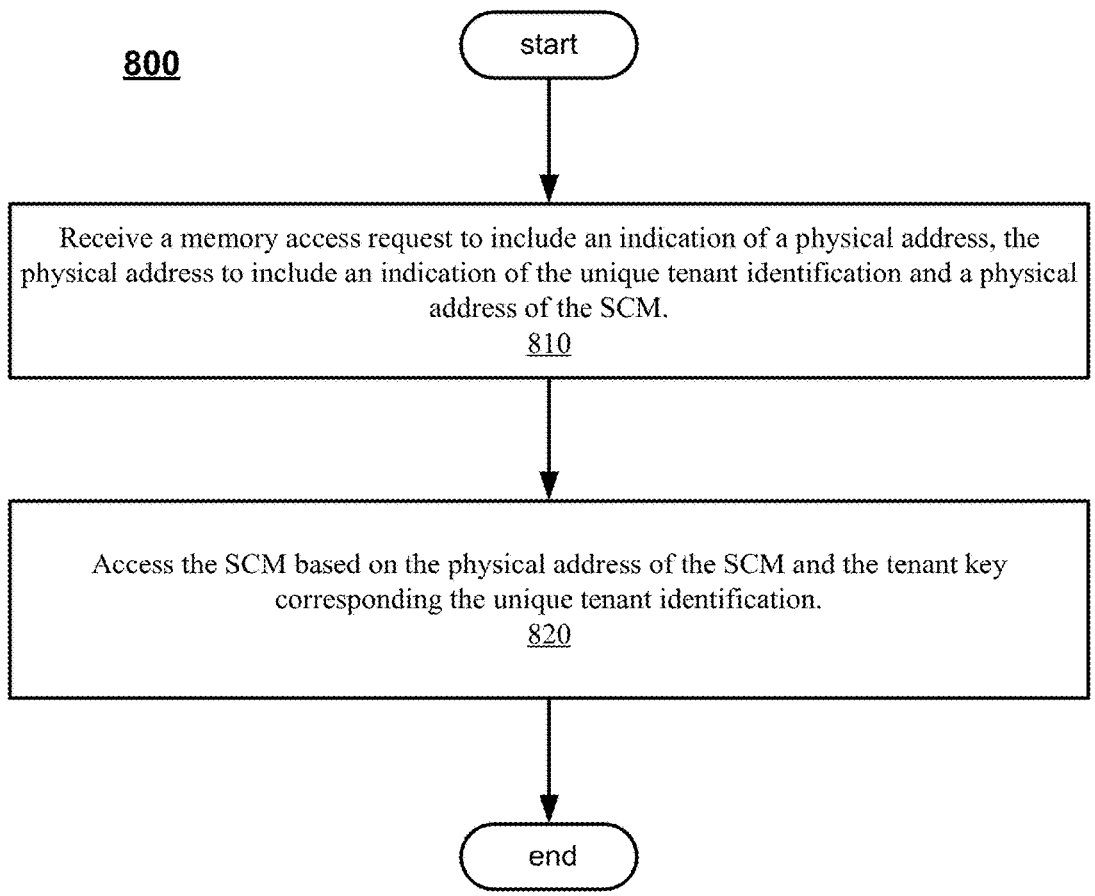
Figure 9:
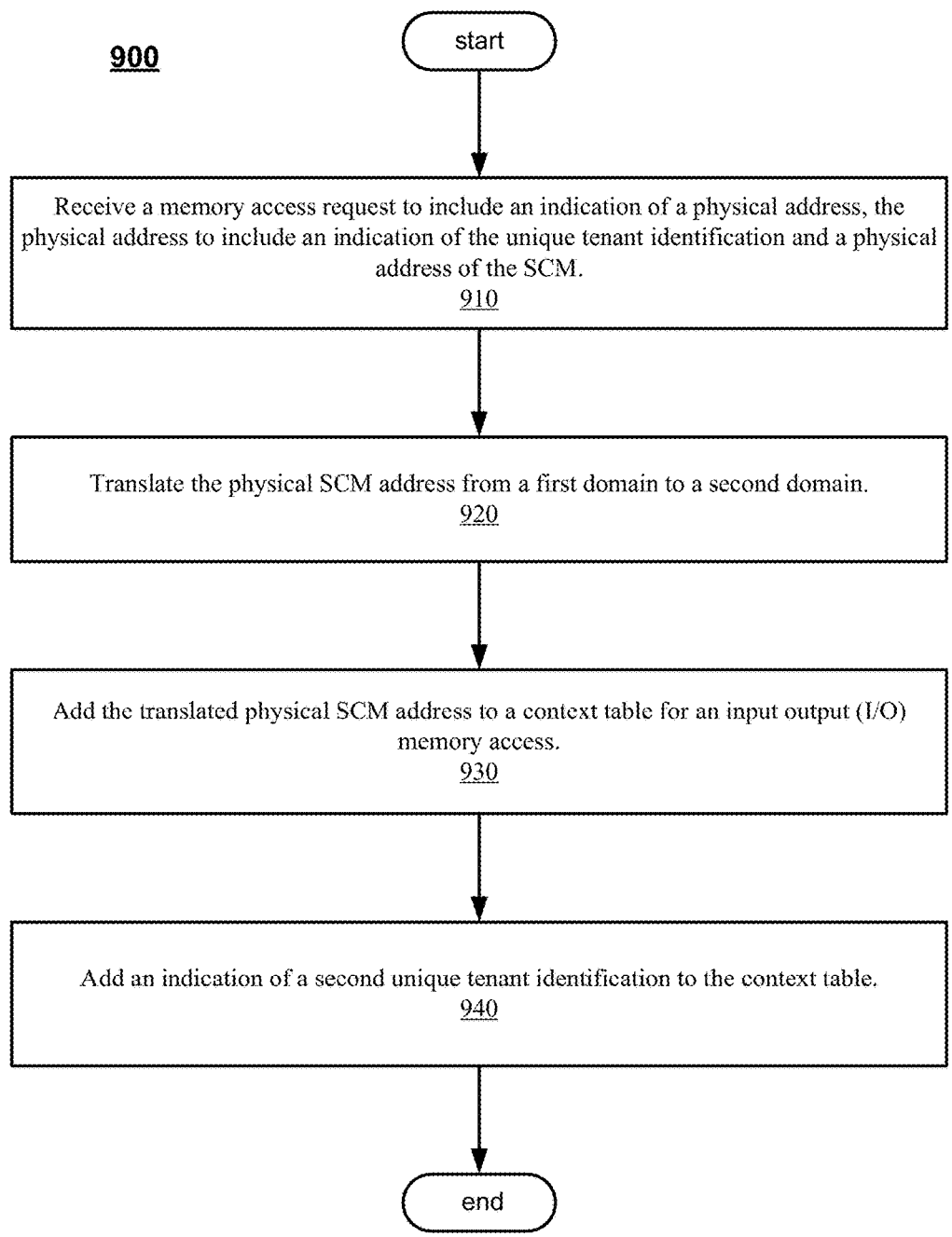

FIGS. 7-9 illustrate embodiments of logic flows to provide encryption and decryption of data stored on a SCM during a DAS mode. For example, the logic flows may be implemented by elements of multi-tenant system 100 to provide encryption and data security for SCM 130, which can be operated in DAS mode. It is to be appreciated, that the logic flows are described with reference to FIGS. 1-6. However, examples are not limited in this context and in particular, systems and/or devices including similar or different component to those depicted in FIGS. 1-6 may implement the logic flows.

Turning more specifically to FIG. 7, a logic flow 700 to generate an encryption key for a multi-tenant SCM is depicted. Logic flow 700 can begin at block 710. At block 1210, "add a tenant encryption key to a key table of a processor element, the tenant encryption key corresponding to a tenant of a plurality of tenants," host 150 can add a tenant encryption key 211 to a key table 210, the tenant encryption key 211 a one of a number of tenant encryption keys 211. For example, key wrapper 152 of host 150 can add tenant key 211-1 to key table 210.

Continuing to block 720, "add a unique tenant identification to the key table to identify the tenant encryption key," the host 150 can add and/or associate a unique tenant ID 212 to the tenant encryption key 211 added to the key table 210 at block 710. For example, key wrapper 152 of host 150 can add key ID 212-1 associated with tenant encryption key 211-1 and tenant 160-1 to key table 210.

Continuing to block 730, "configure at least one memory page of a storage class memory (SCM) page table to include an indication of the unique tenant identification," the host 150 can configure a page table to include an indication of the unique tenant ID. For example, page table configuration unit 154 of host 150 can configure page table 300, and particularly, physical address 301 of page table 300 to include an indication to key ID 212-1.

Turning more specifically to FIG. 8, a logic flow 800 to access a memory in an SCM system using DAS is depicted. Logic flow 800 can begin at block 810. At block 810, "receive a memory access request to include an indication of a physical address, the physical address to include an indication of the unique tenant identification and a physical address of the SCM," memory controller 120 can receive a memory access request including an indication of a physical address which includes an indication of a unique tenant ID. For example, physical address parser 122 of memory controller 120 can receive physical address 301 including an indication of key ID 212-1 (e.g., in a number of the most significant bits of the physical address, or the like).

Continuing to block 820, "access the SCM based on the physical address of the SCM and the tenant key corresponding the unique tenant identification," the memory controller 120 can access the SCM based on the physical address and the unique tenant ID. For example, physical address parser 122 of memory controller 120 can determine an SCM physical address 303 from physical address 301 and a tenant encryption key 211 (e.g., tenant encryption key 211-1, or the like) based on key ID 212 (e.g., key ID 212-1, or the like). Additionally, memory encryption/decryption unit 124 can access data in the SCM using the SCM physical address 303 and encrypt or decrypt the data based on the tenant encryption key 211.

Turning more specifically to FIG. 9, a logic flow 900 to provide memory I/O in an SCM system is depicted. Logic flow 900 can begin at block 910. At block 910, "receive a memory access request to include an indication of a physical address, the physical address to include an indication of the unique tenant identification and a physical address of the SCM," host controller 600 can receive a memory access request including an indication of a physical address which includes an indication of a unique tenant ID. For example, host controller 600 can receive physical address 301 including an indication of key ID 212-1 (e.g., in a number of the most significant bits of the physical address, or the like).

Continuing to block 920, "translate the physical SCM address from a first domain to a second domain," memory management unit (MMU) 610 (e.g., IOMMU, or the like) can translate the physical SCM address indicated in the memory access request from a first domain to a second domain (e.g., from a virtual or tenant domain to a host domain, or the like).

Continuing to block 930, "add the translated physical SCM address to a context table for an input output (I/O) memory access," memory management unit (MMU) 610 (e.g., IOMMU, or the like) can add the translate the physical SCM address to a context table for an I/O memory access, such as, for example, context table 601.

Continuing to block 940, "add an indication of a second unique tenant identification to the context table," memory management unit (MMU) 610 (e.g., IOMMU, or the like) can add an indication of a second tenant ID (e.g., key ID 212-2, or the like) to the context table 601.

Figure 10:
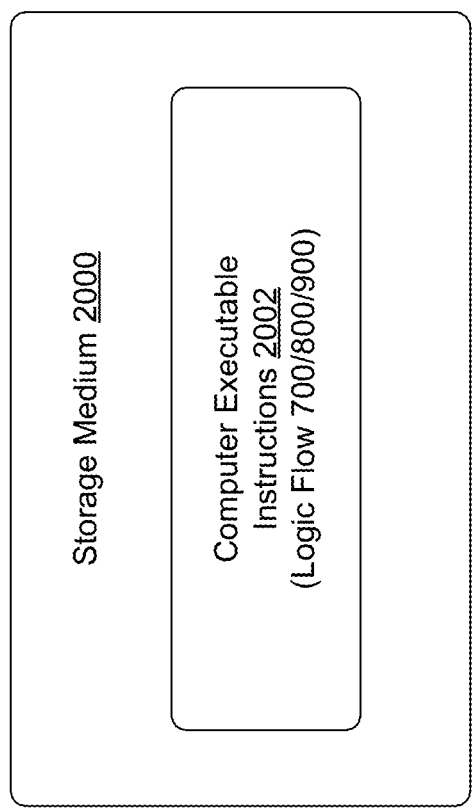
FIG. 10 illustrates a block diagram of an embodiment of computer-readable storage medium.

FIG. 10 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions e.g., 2002). For example, the storage medium 2000 may store various types of computer executable instructions to implement logic flow 700. In some examples, the storage medium 2000 may store various types of computer executable instructions to implement logic flow 800. In some examples, the storage medium 2000 may store various types of computer executable instructions to implement logic flow 900.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 11:
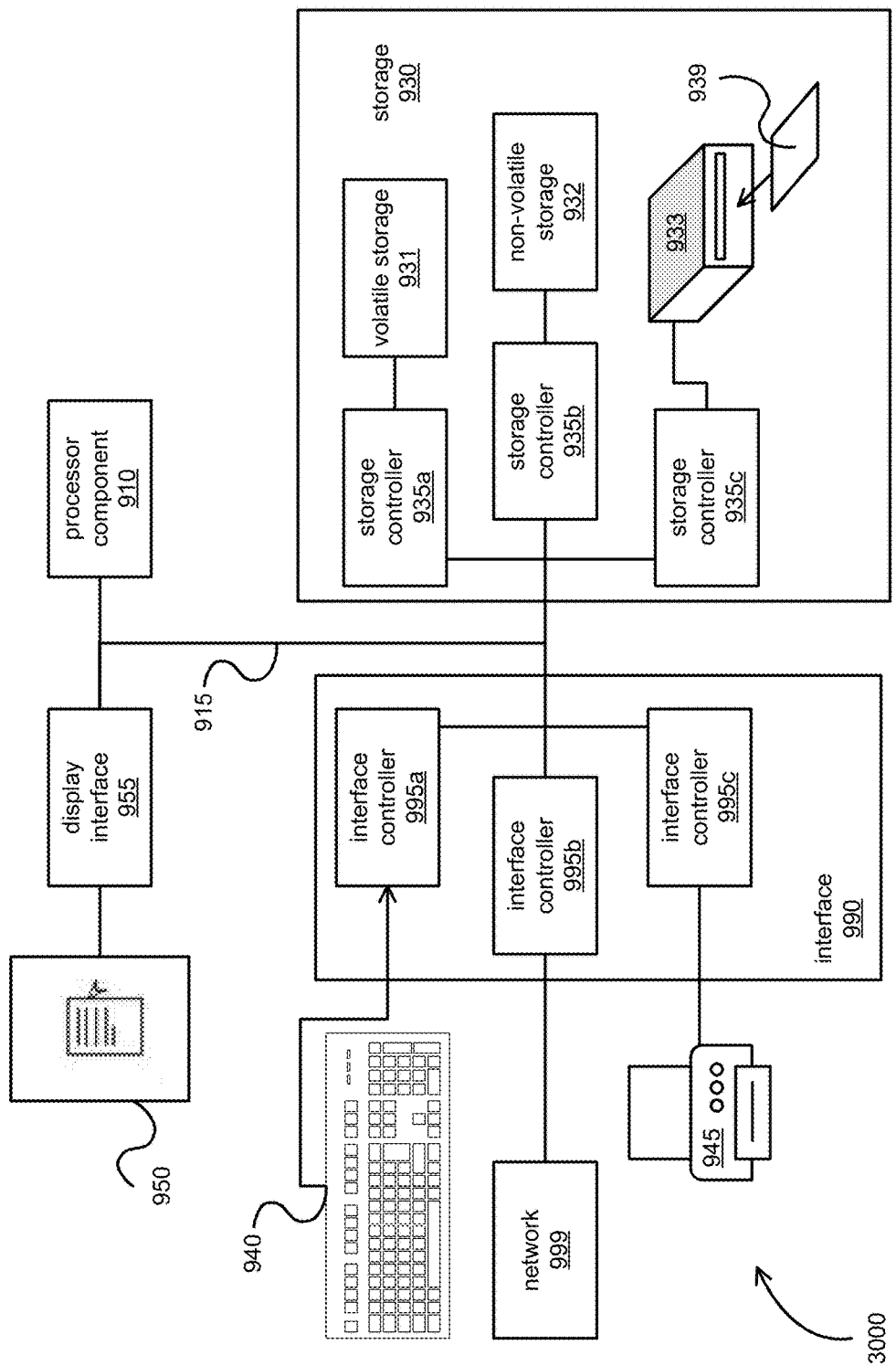
FIG. 11 illustrates a block diagram of an embodiment of a processing architecture.

FIG. 11 illustrates an embodiment of an exemplary processing architecture 3000 suitable for implementing various embodiments as previously described. More specifically, the processing architecture 3000 (or variants thereof) may be implemented as part of the system 100.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor element, the processor element itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. Each message may be a signal or a plurality of signals transmitted either serially or substantially in parallel.

As depicted, in implementing the processing architecture 3000, a computing device incorporates at least a processor element 3910, a storage 3930, an interface 3990 to other devices, and coupling 3915. Depending on various aspects of a computing device implementing the processing architecture 3000, including its intended use and/or conditions of use, such a computing device may further incorporate additional components, such as without limitation, a counter element 3915.

The coupling 3915 incorporates one or more buses, point-to-point interconnects, transceivers, buffers, crosspoint switches, and/or other conductors and/or logic that communicatively couples at least the processor element 3910 to the storage 3930. The coupling 3915 may further couple the processor element 3910 to one or more of the interface 3990 and the display interface 3955 (depending on which of these and/or other components are also present). With the processor element 3910 being so coupled by couplings 3915, the processor element 3910 is able to perform the various ones of the tasks described at length above, for the processing architecture 3000. The coupling 3915 may be implemented with any of a variety of technologies or combinations of technologies by which signals are optically and/or electrically conveyed. Further, at least portions of couplings 3915 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor element 3910 may include any of a wide variety of commercially available processors, employing any of a wide variety of technologies and implemented with one or more cores physically combined in any of a number of ways.

As previously discussed, the storage 3930 may include one or more distinct storage devices based on any of a wide variety of technologies or combinations of technologies. More specifically, as depicted, the storage 3930 may include one or more of a volatile storage 3931 (e.g., solid state storage based on one or more forms of RAM technology), a non-volatile storage 3932 (e.g., solid state, ferromagnetic or other storage not requiring a constant provision of electric power to preserve their contents), and a removable media storage 3933 (e.g., removable disc or solid state memory card storage by which information may be conveyed between computing devices). This depiction of the storage 3930 as possibly comprising multiple distinct types of storage is in recognition of the commonplace use of more than one type of storage device in computing devices in which one type provides relatively rapid reading and writing capabilities enabling more rapid manipulation of data by the processor element 3910 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 931 is present and is based on RAM technology, the volatile storage 931 may be communicatively coupled to coupling 915 through a storage controller 935*a* providing an appropriate interface to the volatile storage 931 that perhaps employs row and column addressing, and where the storage controller 935*a* may perform row refreshing and/or other maintenance tasks to aid in preserving information stored within the volatile storage 931. By way of another example, where the non-volatile storage 932 is present and includes one or more ferromagnetic and/or solid-state disk drives, the non-volatile storage 932 may be communicatively coupled to coupling 915 through a storage controller 935*b* providing an appropriate interface to the non-volatile storage 932 that perhaps employs addressing of blocks of information and/or of cylinders and sectors. By way of still another example, where the removable media storage 933 is present and includes one or more optical and/or solid-state disk drives employing one or more pieces of removable machine-readable storage media 939, the removable media storage 933 may be communicatively coupled to coupling 915 through a storage controller 935*c* providing an appropriate interface to the removable media storage 933 that perhaps employs addressing of blocks of information, and where the storage controller 935*c* may coordinate read, erase and write operations in a manner specific to extending the lifespan of the machine-readable storage media 939.

One or the other of the volatile storage 931 or the non-volatile storage 932 may include an article of manufacture in the form of a machine-readable storage media on which a routine comprising a sequence of instructions executable by the processor element 910 may be stored, depending on the technologies on which each is based. By way of example, where the non-volatile storage 932 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to removable storage media such as a floppy diskette. By way of another example, the non-volatile storage 932 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine comprising a sequence of instructions to be executed by the processor element 910 may initially be stored on the machine-readable storage media 939, and the removable media storage 933 may be subsequently employed in copying that routine to the non-volatile storage 932 for longer term storage not requiring the continuing presence of the machine-readable storage media 939 and/or the volatile storage 931 to enable more rapid access by the processor element 910 as that routine is executed.

As previously discussed, the interface 990 may employ any of a variety of signaling technologies corresponding to any of a variety of communications technologies that may be employed to communicatively couple a computing device to one or more other devices. Again, one or both of various forms of wired or wireless signaling may be employed to enable the processor element 910 to interact with input/output devices (e.g., the depicted example keyboard 940 or printer 945) and/or other computing devices, possibly through a network (e.g., the network 999) or an interconnected set of networks. In recognition of the often greatly different character of multiple types of signaling and/or protocols that must often be supported by any one computing device, the interface 990 is depicted as comprising multiple different interface controllers 995*a*, 995*b* and 995*c*. The interface controller 995*a* may employ any of a variety of types of wired digital serial interface or radio frequency wireless interface to receive serially transmitted messages from user input devices, such as the depicted keyboard 940. The interface controller 995*b* may employ any of a variety of cabling-based or wireless signaling, timings and/or protocols to access other computing devices through the depicted network 999 (perhaps a network comprising one or more links, smaller networks, or perhaps the Internet). The interface 995*c* may employ any of a variety of electrically conductive cabling enabling the use of either serial or parallel signal transmission to convey data to the depicted printer 945. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, inkjet printers, mechanical robots, milling machines, etc.

Where a computing device is communicatively coupled to (or perhaps, actually incorporates) a display (e.g., the depicted example display 950), such a computing device implementing the processing architecture 3000 may also incorporate the display interface 955. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 955 in a communicative coupling of the display 950 may make use of signaling and/or protocols that conform to any of a variety of industry standards, including without limitation, any of a variety of analog video interfaces, Digital Video Interface (DVI), DisplayPort, etc.

More generally, the various elements of the devices described herein may include various hardware elements, software elements, or a combination of both. Examples of hardware elements may include devices, logic devices, components, processors, microprocessors, circuits, processor elements, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The disclosure now turns to providing illustrative examples:

Example 1

An apparatus for a memory controller to provide encrypted multi-tenant direct access storage to a storage class memory, the apparatus comprising logic, at least a portion of which is implemented in hardware, the logic to: add a tenant encryption key to a key table of the processor element, the tenant encryption key corresponding to a tenant of a plurality of tenants; add a tenant identification to the key table to identify the tenant encryption key; and configure at least one memory page of a storage class memory (SCM) page table to include an indication of the tenant identification.

Example 2

The apparatus of example 1, the at least one memory page comprising an indication of a physical SCM address, the logic to add the indication of the tenant identification to a portion of the physical address.

Example 3

The apparatus of example 2, wherein the physical address comprises 52 bits and the tenant identification comprises 6 bits, the logic to add the indication of the tenant identification to the 6 most significant bits of the physical address.

Example 4

The apparatus of example 1, the logic to encrypt the SCM corresponding to the at least one memory page based in part on the tenant encryption key.

Example 5

The apparatus of example 1, the logic to: receive a memory access request to include an indication of a physical address, the physical address to include an indication of the tenant identification and a physical SCM address; and access the SCM based on the physical SCM address and the tenant key corresponding the tenant identification.

Example 6

The apparatus of example 5, the logic to access the SCM comprising encrypting or decrypting a memory page of the SCM using the tenant key.

Example 7

The apparatus of example 1, the logic to: receive a memory access request to include an indication of a physical address, the physical address to include an indication of the tenant identification and a physical SCM address; translate the physical SCM address from a first domain to a second domain; add the translated physical SCM address to a context table for an input output (I/O) memory access; and add an indication of a second tenant identification to the context table.

Example 8

The apparatus of example 7, the logic to: retrieve an information element from the SCM based on a memory access to the physical SCM address and the tenant key corresponding to the tenant identification; and encrypt the information element based on a tenant key corresponding to the second tenant identification.

Example 9

The apparatus of example 8, the logic to add the encrypted information element to a direct memory access (DMA) buffer of an I/O device, the I/O device corresponding to the second tenant identification.

Example 10

The apparatus of example 9, the logic: generate an initial encryption key; and wrap the initial encryption key to generate the tenant encryption key.

Example 11

At least one machine-readable storage medium comprising instructions to provide encrypted multi-tenant direct access storage to a storage class memory, the instructions when executed by a processor element, cause the processor element to: add a tenant encryption key to a key table of the processor element, the tenant encryption key corresponding to a tenant of a plurality of tenants; add a tenant identification to the key table to identify the tenant encryption key; and configure at least one memory page of a storage class memory (SCM) page table to include an indication of the tenant identification.

Example 12

The at least one machine-readable storage medium of example 11, the at least one memory page comprising an indication of a physical SCM address, the medium comprising instructions that further cause the processor element to add the indication of the tenant identification to a portion of the physical address.

Example 13

The at least one machine-readable storage medium of example 12, wherein the physical address comprises 52 bits and the tenant identification comprises 6 bits, the medium comprising instructions that further cause the processor element to add the indication of the tenant identification to the 6 most significant bits of the physical address.

Example 14

The at least one machine-readable storage medium of example 11, comprising instructions that further cause the processor element to encrypt the SCM corresponding to the at least one memory page based in part on the tenant encryption key.

Example 15

The at least one machine-readable storage medium of example 11, comprising instructions that further cause the processor element to: receive a memory access request to include an indication of a physical address, the physical address to include an indication of the tenant identification and a physical SCM address; and access the SCM based on the physical SCM address and the tenant key corresponding the tenant identification.

Example 16

The at least one machine-readable storage medium of example 15, comprising instructions that further cause the processor element to access the SCM comprising encrypting or decrypting a memory page of the SCM using the tenant key.

Example 17

The at least one machine-readable storage medium of example 11, comprising instructions that further cause the processor element to: receive a memory access request to include an indication of a physical address, the physical address to include an indication of the tenant identification and a physical SCM address; translate the physical SCM address from a first domain to a second domain; add the translated physical SCM address to a context table for an input output (I/O) memory access; and add an indication of a second tenant identification to the context table.

Example 18

The at least one machine-readable storage medium of example 17, comprising instructions that further cause the processor element to: retrieve an information element from the SCM based on a memory access to the physical SCM address and the tenant key corresponding to the tenant identification; and encrypt the information element based on a tenant key corresponding to the second tenant identification.

Example 19

The at least one machine-readable storage medium of example 18, comprising instructions that further cause the processor element to add the encrypted information element to a direct memory access (DMA) buffer of an I/O device, the I/O device corresponding to the second tenant identification.

Example 20

The at least one machine-readable storage medium of example 11, comprising instructions that further cause the processor element to: generate an initial encryption key; and wrap the initial encryption key to generate the tenant encryption key.

Example 21

A system to provide encrypted multi-tenant direct access storage to a storage class memory, the system comprising: a storage class memory (SCM); a memory controller coupled to the storage class memory to access the SCM; and logic, at least a portion of which is implemented in hardware, the logic to: add a tenant encryption key to a key table of the processor element, the tenant encryption key corresponding to a tenant of a plurality of tenants; add a tenant identification to the key table to identify the tenant encryption key; and configuring at least one memory page of a storage class memory (SCM) page table to include an indication of the tenant identification.

Example 22

The system of example 21, the at least one memory page comprising an indication of a physical SCM address, the logic to add the indication of the tenant identification to a portion of the physical address.

Example 23

The system of example 22, wherein the physical address comprises 52 bits and the tenant identification comprises 6 bits, the logic to add the indication of the tenant identification to the 6 most significant bits of the physical address.

Example 24

The system of example 21, the memory controller to encrypt the SCM corresponding to the at least one memory page based in part on the tenant encryption key.

Example 25

The system of example 21, the memory controller to: receive a memory access request to include an indication of a physical address, the physical address to include an indication of the tenant identification and a physical SCM address; and access the SCM based on the physical SCM address and the tenant key corresponding the tenant identification.

Example 26

The system of example 25, the memory controller to access the SCM comprising encrypting or decrypting a memory page of the SCM using the tenant key.

Example 27

The system of example 21, the logic to: receive a memory access request to include an indication of a physical address, the physical address to include an indication of the tenant identification and a physical SCM address; translate the physical SCM address from a first domain to a second domain; add the translated physical SCM address to a context table for an input output (I/O) memory access; and add an indication of a second tenant identification to the context table.

Example 28

The system of example 27, the memory controller to: retrieve an information element from the SCM based on a memory access to the physical SCM address and the tenant key corresponding to the tenant identification; and encrypt the information element based on a tenant key corresponding to the second tenant identification.

Example 29

The system of example 28, the memory controller to add the encrypted information element to a direct memory access (DMA) buffer of an I/O device, the I/O device corresponding to the second tenant identification.

Example 30

The system of example 21, the logic: generate an initial encryption key; and wrap the initial encryption key to generate the tenant encryption key.

Example 31

A computer-implemented method to provide encrypted multi-tenant direct access storage to a storage class memory, the method comprising: adding a tenant encryption key to a key table of a processor element, the tenant encryption key corresponding to a tenant of a plurality of tenants; adding a tenant identification to the key table to identify the tenant encryption key; and configuring at least one memory page of a storage class memory (SCM) page table to include an indication of the tenant identification.

Example 32

The computer-implemented method of example 31, the at least one memory page comprising an indication of a physical SCM address, the method comprising adding the indication of the tenant identification to a portion of the physical address.

Example 33

The computer-implemented method of example 32, wherein the physical address comprises 52 bits and the tenant identification comprises 6 bits, the method comprising adding the indication of the tenant identification to the 6 most significant bits of the physical address.

Example 34

The computer-implemented method of example 31, comprising encrypting the SCM corresponding to the at least one memory page based in part on the tenant encryption key.

Example 35

The computer-implemented method of example 31, comprising: receiving a memory access request to include an indication of a physical address, the physical address to include an indication of the tenant identification and a physical SCM address; and accessing the SCM based on the physical SCM address and the tenant key corresponding the tenant identification.

Example 36

The computer-implemented method of example 35, accessing the SCM comprising encrypting or decrypting a memory page of the SCM using the tenant key.

Example 37

The computer-implemented method of example 31, comprising: receiving a memory access request to include an indication of a physical address, the physical address to include an indication of the tenant identification and a physical SCM address; translating the physical SCM address from a first domain to a second domain; adding the translated physical SCM address to a context table for an input output (I/O) memory access; and adding an indication of a second tenant identification to the context table.

Example 38

The computer-implemented method of example 37, comprising: retrieving an information element from the SCM based on a memory access to the physical SCM address and the tenant key corresponding to the tenant identification; and encrypting the information element based on a tenant key corresponding to the second tenant identification.

Example 39

The computer-implemented method of example 38, comprising adding the encrypted information element to a direct memory access (DMA) buffer of an I/O device, the I/O device corresponding to the second tenant identification.

Example 40

The computer-implemented method of example 31, comprising: generating an initial encryption key; and wrapping the initial encryption key to generate the tenant encryption key.

Example 41

An apparatus for a device, the apparatus comprising means for performing the method of any one of examples 31 to 40.

Example 42

An apparatus to provide encrypted multi-tenant direct access storage to a storage class memory, the apparatus comprising: a memory controller communicatively coupled to a processor element, the memory controller to: add a tenant encryption key to a key table of the processor element, the tenant encryption key corresponding to a tenant of a plurality of tenants; add a tenant identification to the key table to identify the tenant encryption key; and configure at least one memory page of a storage class memory (SCM) page table to include an indication of the tenant identification.

Example 43

The apparatus of example 42, comprising the processor element, the processor element communicatively coupled to the memory controller.

Example 44

The apparatus of example 42, the at least one memory page comprising an indication of a physical SCM address, the memory controller to add the indication of the tenant identification to a portion of the physical address.

Example 45

The apparatus of example 44, wherein the physical address comprises 52 bits and the tenant identification comprises 6 bits, the memory controller to add the indication of the tenant identification to the 6 most significant bits of the physical address.

Example 46

The apparatus of example 42, the memory controller to encrypt the SCM corresponding to the at least one memory page based in part on the tenant encryption key.

Example 47

The apparatus of example 42, the memory controller to: receive a memory access request to include an indication of a physical address, the physical address to include an indication of the tenant identification and a physical SCM address; and access the SCM based on the physical SCM address and the tenant key corresponding the tenant identification.

Example 48

The apparatus of example 42, the memory controller to encrypt or decrypt the at least one memory page of the SCM using the tenant key.

Example 49

The apparatus of example 42, the memory controller to: receive a memory access request to include an indication of a physical address, the physical address to include an indication of the tenant identification and a physical SCM address; translate the physical SCM address from a first domain to a second domain; add the translated physical SCM address to a context table for an input output (I/O) memory access; and add an indication of a second tenant identification to the context table.

Example 50

The apparatus of example 49, the memory controller to: retrieve an information element from the SCM based on a memory access to the physical SCM address and the tenant key corresponding to the tenant identification; and encrypt the information element based on a tenant key corresponding to the second tenant identification.

Example 51

The apparatus of example 50, the memory controller to add the encrypted information element to a direct memory access (DMA) buffer of an I/O device, the I/O device corresponding to the second tenant identification.

Example 52

The apparatus of example 51, the memory controller to: generate an initial encryption key; and wrap the initial encryption key to generate the tenant encryption key.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The disclosure now turns to providing various examples implementations.

What is claimed is:
1. An apparatus comprising:
a memory controller communicatively coupled to a processor element, the memory controller to:
add a tenant encryption key to a key table of the processor element, the tenant encryption key corresponding to a tenant of a plurality of tenants;
add a unique tenant identification to the key table to identify the tenant encryption key; and
configure a physical address comprising a set of bits in a page table for at least one memory page of a storage class memory (SCM) to include an indication of the unique tenant identification and an SCM physical address, wherein the indication of the unique tenant identification includes a first subset of the set of bits and the SCM physical address includes a second subset of the set of bits.

2. The apparatus of claim 1, comprising the processor element, the processor element implemented to provide a computing environment for the plurality of tenants.

3. The apparatus of claim 1, the memory controller to add the indication of the unique tenant identification to a portion of the physical address.

4. The apparatus of claim 1, wherein the set of bits of the physical address comprises 52 bits, the unique tenant identification comprises 6 bits, and the first subset of the set of bits comprises the 6 most significant bits of the physical address, the memory controller to add the indication of the unique tenant identification to the 6 most significant bits of the physical address.

5. The apparatus of claim 1, the memory controller to encrypt the SCM corresponding to the at least one memory page based in part on the tenant encryption key.

6. The apparatus of claim 1, the memory controller to:
receive a memory access request including an indication of the physical address, the physical address to include the indication of the unique tenant identification and the SCM physical address; and
access the SCM based on the SCM physical address and the tenant encryption key corresponding the unique tenant identification.

7. The apparatus of claim 1, the memory controller to encrypt or decrypt the at least one memory page of the SCM using the tenant encryption key.

8. The apparatus of claim 1, the memory controller to:
receive a memory access request including an indication of the physical address, the physical address to include the indication of the unique tenant identification and the SCM physical address;
translate the SCM physical address from a first domain to a second domain;
add the translated SCM physical address to a context table for an input output (I/O) memory access; and
add an indication of a second unique tenant identification to the context table.

9. The apparatus of claim 8, the memory controller to:
retrieve an information element from the SCM based on a memory access to the SCM physical address and the tenant encryption key corresponding to the unique tenant identification; and
encrypt the information element based on a tenant key corresponding to the second unique tenant identification.

10. The apparatus of claim 9, the memory controller to add the encrypted information element to a direct memory access (DMA) buffer of an I/O device, the I/O device corresponding to the second unique tenant identification.

11. The apparatus of claim 10, the memory controller to:
generate an initial encryption key; and
wrap the initial encryption key to generate the tenant encryption key.

12. At least one non-transitory machine-readable storage medium comprising instructions that when executed by a processor element, cause the processor element to:
add a tenant encryption key to a key table of the processor element, the tenant encryption key corresponding to a tenant of a plurality of tenants;
add a tenant identification to the key table to identify the tenant encryption key; and
configure a physical address comprising a set of bits in a page table for at least one memory page of a storage class memory (SCM) to include an indication of the tenant identification and an SCM physical address, wherein the indication of the tenant identification includes a first subset of the set of bits and the SCM physical address includes a second subset of the set of bits.

13. The at least one non-transitory machine-readable storage medium of claim 12, the medium comprising instructions that further cause the processor element to add the indication of the tenant identification to a portion of the physical address.

14. The at least one non-transitory machine-readable storage medium of claim 12, wherein the set of bits of the physical address comprises 52 bits, the tenant identification comprises 6 bits, and the first subset of the set of bits comprises the 6 most significant bits of the physical address, the medium comprising instructions that further cause the processor element to add the indication of the tenant identification to the 6 most significant bits of the physical address.

15. The at least one non-transitory machine-readable storage medium of claim 12, comprising instructions that further cause the processor element to encrypt the SCM corresponding to the at least one memory page based in part on the tenant encryption key.

16. The at least one non-transitory machine-readable storage medium of claim 12, comprising instructions that further cause the processor element to:
receive a memory access request including an indication of the physical address, the physical address to include the indication of the tenant identification and the SCM physical address; and
access the SCM based on the SC physical address and the tenant encryption key corresponding the tenant identification.

17. The at least one non-transitory machine-readable storage medium of claim 16, comprising instructions that further cause the processor element to access the SCM comprising encrypting or decrypting a memory page of the SCM using the tenant encryption key.

18. The at least one non-transitory machine-readable storage medium of claim 12, comprising instructions that further cause the processor element to:
receive a memory access request including an indication of the physical address, the physical address to include the indication of the tenant identification and the SCM physical address;
translate the SCM physical address from a first domain to a second domain;
add the translated SCM physical address to a context table for an input output (I/O) memory access; and
add an indication of a second tenant identification to the context table.

19. The at least one non-transitory machine-readable storage medium of claim 18, comprising instructions that further cause the processor element to:
retrieve an information element from the SCM based on a memory access to the SCM physical address and the tenant encryption key corresponding to the tenant identification; and
encrypt the information element based on a tenant key corresponding to the second tenant identification.

20. The at least one non-transitory machine-readable storage medium of claim 19, comprising instructions that further cause the processor element to add the encrypted information element to a direct memory access (DMA) buffer of an I/O device, the I/O device corresponding to the second tenant identification.

21. A system comprising:
a storage class memory (SCM);

a memory controller coupled to the storage class memory to access the SCM; and logic, at least a portion of which is implemented in hardware, the logic to:

add a tenant encryption key to a key table of a processor element, the tenant encryption key corresponding to a tenant of a plurality of tenants;

add a tenant identification to the key table to identify the tenant encryption key; and configuring a physical address comprising a set of bits in a page table for at least one memory page of the SCM to include an indication of the tenant identification and an SCM physical address, wherein the indication of the tenant identification includes a first subset of the set of bits and the SCM physical address includes a second subset of the set of bits.

22. The system of claim 21, the logic to add the indication of the tenant identification to a portion of the physical address.

23. The system of claim 21, the logic to:

receive a memory access request including an indication of the physical address, the physical address to include the indication of the tenant identification and the SCM physical address;

translate the SCM physical address from a first domain to a second domain;

add the translated SCM physical address to a context table for an input output (I/O) memory access; and add an indication of a second tenant identification to the context table.

24. A computer-implemented method comprising:

adding a tenant encryption key to a key table of a processor element, the tenant encryption key corresponding to a tenant of a plurality of tenants;

adding a tenant identification to the key table to identify the tenant encryption key; and configuring a physical address comprising a set of bits in a page table for at least one memory page of a storage class memory (SCM) to include an indication of the tenant identification and an SCM physical address, wherein the indication of the tenant identification includes a first subset of the set of bits and the SCM physical address includes a second subset of the set of bits.

25. The computer-implemented method of claim 24, comprising adding the indication of the tenant identification to a portion of the physical address.

26. The computer-implemented method of claim 24, comprising:

receiving a memory access request including an indication of the physical address, the physical address to include the indication of the tenant identification and the SCM physical address; and accessing the SCM based on the SCM physical address and the tenant encryption key corresponding the tenant identification.

* * * * *